United States Patent [19]

Pelzer

[11] 3,712,457
[45] Jan. 23, 1973

[54] LONG-DISTANCE BELT CONVEYOR AND METHOD OF OPERATING SAME

[75] Inventor: Hans Pelzer, Krefeld, Germany

[73] Assignee: Fried. Krupp Gesellschaft mit beschrankter Haftung, Essen, Germany

[22] Filed: Oct. 6, 1970

[21] Appl. No.: 78,473

[52] U.S. Cl. ................................................198/208
[51] Int. Cl. ..............................................B65g 15/30
[58] Field of Search ....................198/192, 208, 184

[56] References Cited

UNITED STATES PATENTS 3,027,993 4/1962 Houben................................198/208
3,217,863 11/1965 Duncan................................198/208

*Primary Examiner*—Edward A. Sroka
*Attorney*—Walter Becker

[57] ABSTRACT

A long-distance conveyor with supporting means spaced relatively far from each other in the longitudinal direction of the conveyor, in which the tension of the belt means of the conveyor is automatically varied in conformity with the loading condition of the belt means in such a way that the preload on the belt is increased in conformity with a decrease in the load carried by the belt.

3 Claims, 8 Drawing Figures

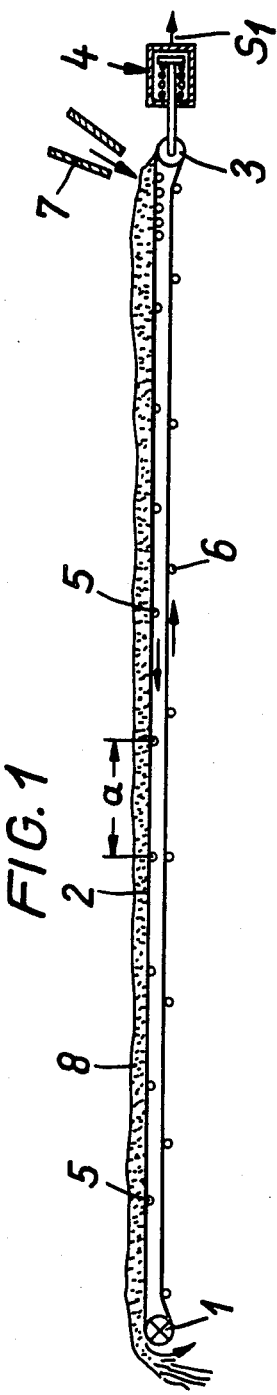
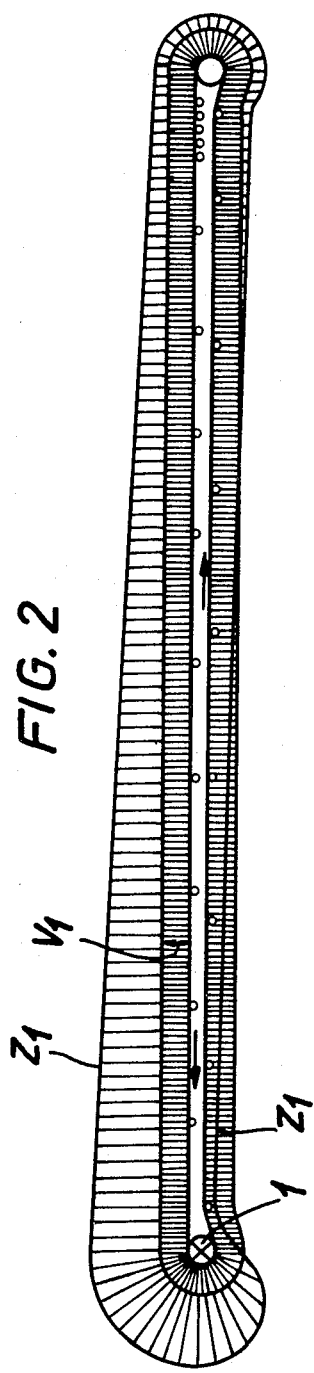
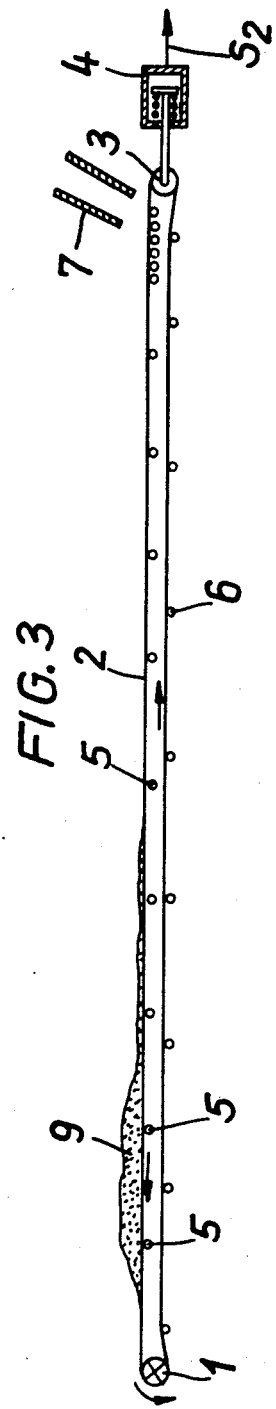

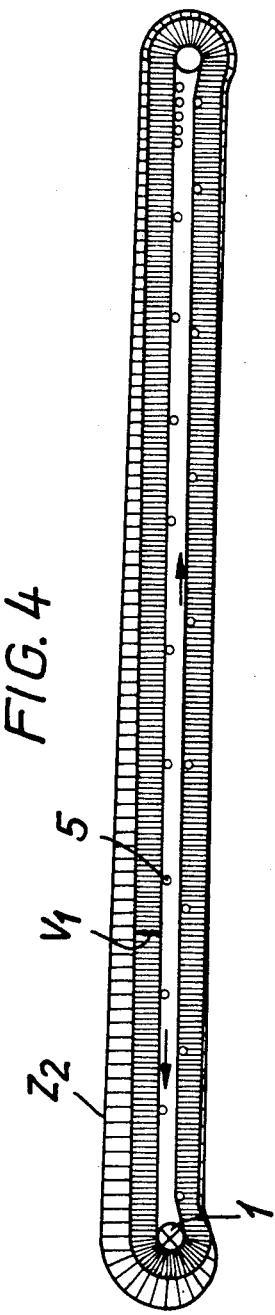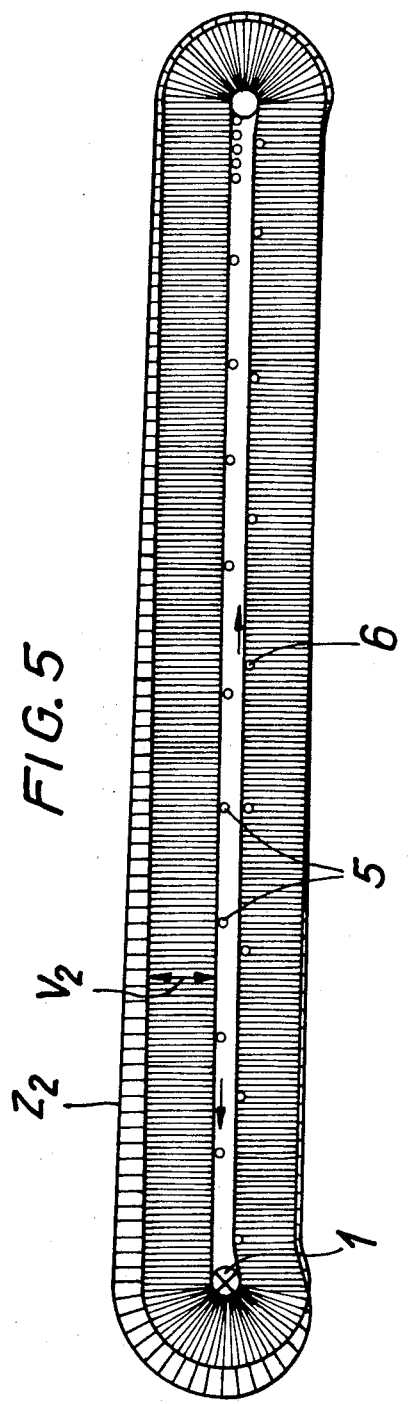

LONG-DISTANCE BELT CONVEYOR AND METHOD OF OPERATING SAME

The present invention relates to long-distance or trunk conveyors for conveying ore, coal, gravel, i.e. material with bulk density values of 0.8 kp/dm³ or more. Such long-distance conveyors which are equipped with sets of rollers or idlers suspended in such a manner as to define the contour of a trough and supporting and correspondingly shaping the conveyor belt have the draw-back that the initial costs as well as the maintenance expenses are relatively high. It has been suggested to reduce such costs by spacing the sets of rollers, also termed troughing idlers, at relatively wide distances from each other. The distance between the sets of troughing idlers has been selected so that the troughing idlers have a minimum spacing from each other of $a = 2.8 - 0.4 \ln B$ in meters over at least one third of the length of the conveyor — figured from the drive terminal —; B being the belt width in meters and ln being the natural logarithm. The untroughing of the belt between the sets of troughing idlers is prevented by inclining the lateral rollers of the set of troughing idlers in a manner known per se at an angle of at least 30°.

When with such trunk conveyor the conveyor belt is not fully loaded, it may occur, in view of the corresponding lower driving force, that the pulling stress or tension in the belt will be insufficient to prevent an undue sagging of the belt under partial load between two sets of troughing idlers spaced from each other by a rather wide distance. This is particularly intolerable when an incomplete loading of the conveyor belt occurs not only in rare instances at the start and at the end of a conveying operation but when it occurs frequently due to outer circumstances. It will be appreciated that under such circumstances a conveyor operation will encounter frequent considerable sagging of the belt with the inherent harmful stresses on the belt and on the bearings for the sets of troughing idlers.

It is, therefore, an object of the present invention to provide a long-distance conveyor and method of operating same which will overcome the above mentioned drawbacks.

This object and other objects and advantages of the invention will appear more clearly from the following specification in connection with the accompanying drawings, in which:

FIG. 1a diagrammatically illustrates a portion of a long-distance conveyor of the type involved.

FIG. 1 diagrammatically illustrates a long-distance conveyor according to the present invention with the conveyor belt loaded over its entire length.

FIG. 2 diagrammatically illustrates a side view of the conveyor belt of FIG. 1 and shows the pulling stresses occuring in the belt as ordinates rectangular to the contour of the endless belt; the conditions shown in FIG. 2 applying to the fully loaded belt of FIG. 1.

FIG. 3 is a view similar to that of FIG. 1 with the conveyor belt only partially loaded.

FIGS. 4 and 5 are views similar to that of FIG. 2 but for a partially loaded conveyor belt; FIG. 4 showing the conditions without applying the present invention and FIG. 5 showing the conditions when applying the present invention.

Figure 6:
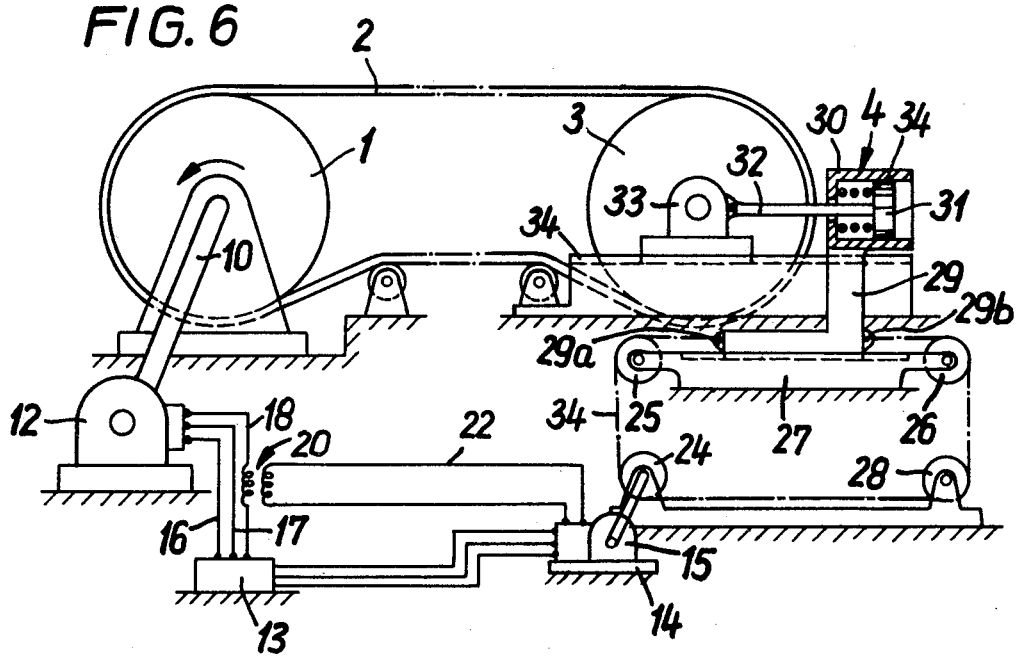

FIG. 6 diagrammatically illustrates a first embodiment of an automatic belt tension control according to the invention.

Figure 7:
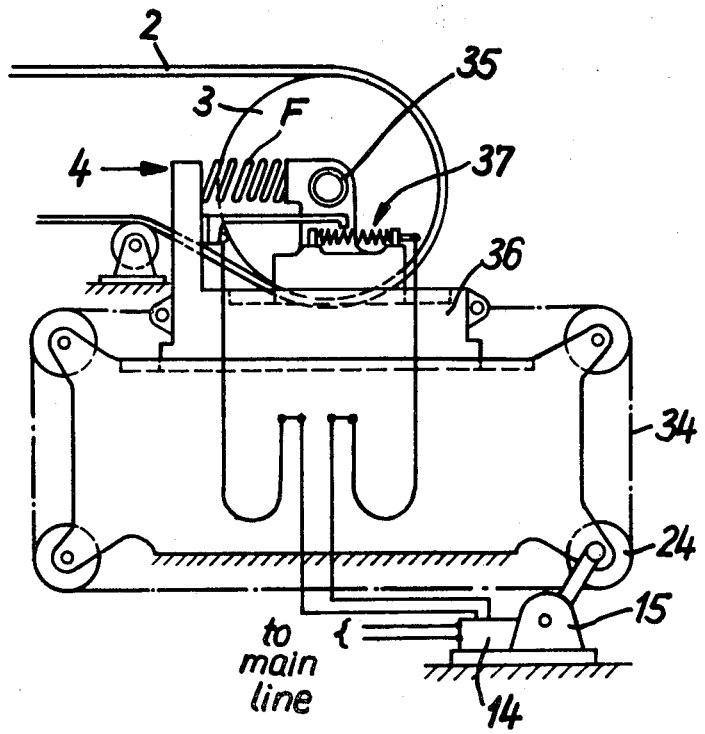

FIG. 7 shows another automatic belt tension control according to the invention.

The long-distance conveyor according to the present invention is characterized primarily in that when the conveyor belt during its operation is not fully loaded, the preload in the belt is by means of a tensioning device increased to such an extent that at least within the region of the greater distance between the sets of troughing idlers there will prevail approximately the same belt tension as in the normally preloaded belt when it operates under full load. The respective change in the belt tension or belt preload is preferably effected automatically. Accordingly, the tensioning device may have a control system which responds, for instance, to the current consumption of the conveyor belt driving system or which is influenced by the load on the bearings of the reversing drum supporting the belt.

Figure 1A:
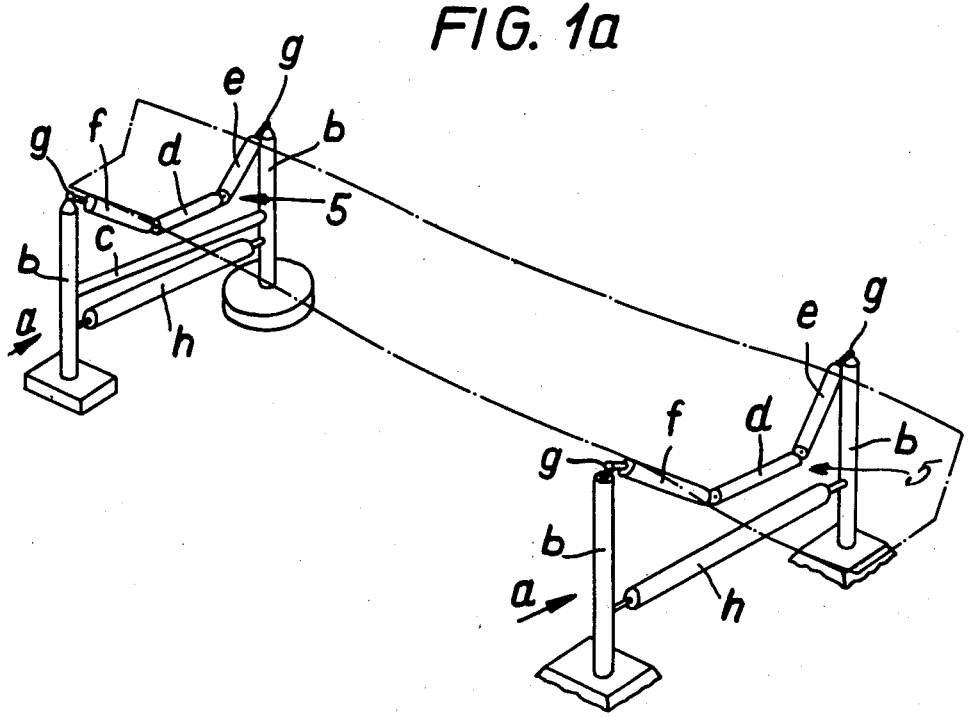

Referring now to the drawings in detail, FIG. 1a diagrammatically illustrates some of the general elements making up a long-distance conveyor. The long-distance conveyor shown in FIG. 1a comprises primarily stands generally designated $a$ each of which has two posts $b$ rigidly connected to each other by a cross bar $c$. Above the cross bar $c$ there is a set of troughing idlers generally designated 5 and having, for instance, a central idler $d$ linked to lateral idlers $e$ and $f$. The three idlers $d$, $e$ and $f$ form an articulated chain which by means of pivots $g$ is suspended on and secured to the upper ends of the posts $b$. The lateral idlers $e$ and $f$ are arranged at a relatively steep angle which prevents the untroughing of the load carrying upper side or taut strand of the conveyor belt. Underneath the cross bar $c$ of the stand $a$ there is provided the return idler $h$.

Referring now to FIGS. 1 and 5 diagrammatically explaining the present invention, it should be noted that in view of the limited space available for the drawing, the conveyor is, in comparison to the spacing between the sets of troughing idlers, relatively short. In practice, the conveyor may have a length of several hundred meters and in special instances may have a length of some kilometers. Furthermore, in FIGS. 1 to 5 it is assumed for the sake of simplicity that the reversing drum 1 at the discharge end of the conveyor belt 2 is driven and that the reversing drum 3 at the opposite end of the conveyor is horizontally displaceable by a tensioning device generally designated 4. The upper side or run of the conveyor belt 2 is supported by troughing idlers or roller sets 5. These roller sets, as indicated in connection with FIG. 1a, have a minimum distance $a$ from each other as defined above.

According to FIG. 1, the conveyor belt 2 is fully loaded which means that its upper side or run carries over its entire conveying length an approximately evenly high layer 8 of material to be conveyed. The tensioning device 4 places the belt 2 under a selected preload V1 which prevails as long as the belt is not driven. FIG. 2 shows that the preload V1 is over the entire length of the conveyor belt the same in the upper belt section as well as in the lower belt section.

When the conveyor belt 2 is driven by means of drum 1, the latter will in the belt produce an additional pulling stress which is necessary in order to overcome the frictional resistance in the bearings of the roller sets 5, of the reversing drums 1 and 3 and of the supporting rollers 6 for the lower belt section. This additional pulling stress or pulling tension Z1 is highest at the driving or reversing drum 1 and decreases with increasing distance from drum 1 as viewed in the direction which is opposite to the direction of movement of the belt 2. The greater the distance of a point of the conveyor belt from the driving drum 1, the smaller will be the number of rollers which are kept in motion by the pulling tension prevailing at the said point. In the lower section of the belt in the vicinity of the driving drum 1, the additional pulling tension or pulling stress Z1 in the belt becomes negative. In the upper section of the belt, the additional pulling tension Z1 will be all the greater the more the belt is loaded because the bearing of the troughing idlers or roller sets 5 are under a correspondingly higher load.

According to FIG. 3, the loading of the conveyor belt 2 was interrupted for some time so that only a remaining pile 9 was left on the upper section of the belt. It may for the time being be assumed that according to FIG. 4 the preload in the belt is the same as that in FIG. 2 during full load. The additional pulling tension Z2 in the belt is, however, considerably less than the additional preload Z1 when the belt is under full load. In this connection it should be borne in mind that in view of the small load acting on the conveyor belt, the resistance against the movement of the belt is correspondingly smaller. Accordingly, also the total pulling tension V1 + Z2 acting upon the belt is considerably smaller than the total pulling tension when the belt is under full load. The reduced pulling tension is, however, insufficient to prevent an undue great sagging of the belt between two successive roller sets 5 widely spaced from each other when the remaining quantity of material 9, as shown in FIG. 3, is located in an area of the conveyor belt between two widely spaced roller sets.

In order to prevent such sagging of the conveyor belt, the preload in the belt is, in conformity with the present invention, increased by the tensioning device 4 when the conveyor belt is only under partial load. In FIG. 5 the increased preload is designated with the character V2. In FIG. 3 it is indicated that the reversing drum 3 is by means of the tensioning device 4 displaced upwardly relative to the position of FIG. 1. The force required by the tensioning device for this purpose is in FIG. 3 designated with the character S2, which force is greater than the corresponding tensioning force of FIG. 1.

FIG. 5 furthermore illustrates that the additional pulling force Z2 in the belt which pulling force is to be furnished by the driving drum 1, is superimposed upon the preload V2, and that in this way over the entire conveying distance, the resultant pulling tension V2 + Z2 is sufficiently high to prevent an undue sagging of the conveyor belt under the remaining load 9 between two successive roller sets 5 widely spaced from each other.

The automatic response of the tensioning device 4 to the respective prevailing loading conditions of the conveyor belt may be effected, for instance, in the following manner.

Referring first to the embodiment illustrated in FIG. 6, it will be that drum 1 by means of a shaft 10 is connected to the drave shaft 11 of a drive motor 12 which may e.g. be a three phase motor receiving its current supply from a main circuit connection 13 which latter is also electrically connected to a controller 14 including a control motor 15. One of the three conductors 16, 17, 18 has interposed therein the primary coil 19 of a transformer 20 the secondary coil 21 of which is by a conductor 22 electrically connected to two terminals of controller 14. Control motor 15 is drivingly connected to a pulley 24. There are furthermore provided idling pulleys 25 and 26 rotatably supported by a stationary support 27, and a further stationarily supported idling roller 28. Slidably mounted on support 27 is a carriage 29 having mounted thereon the tensioning device 4 comprising a cylinder 30. Cylinder 30 has reciprocably mounted therein a piston 31 which by means of a piston rod 32 is connected to the bearing 33 for the reversing drum 3, said bearing 33 being slidably mounted on a stationary support 34 so as to be slidable in two opposite directions along the plane extending in the longitudinal direction of connecting rod 32. A pressure spring 30' is interposed between the bottom of cylinder 30 and piston 31 while continuously urging piston 31 to move toward the right with regard to FIG. 6. Finally, a cable, chain or belt, e.g. a V-belt 35 passes over the driving pulley 24 and the idling pulleys 25, 26, 27 and has one end connected to one end 29a of carriage 29 and the other end to the other end 29b of carriage 29.

From the above it will be appreciated that when the load on belt 2 decreases, he current supply of the drive motor 12 decreases, which fact is translated by the transformer 29 to the control motor 15 with the result that motor 15 through the intervention of pulley 24 and cable 34 moves the tensioning device 4 toward the right with regard to FIG. 6 so that the preload on belt 2 will be increased. When inversely the load on belt 2 will again increase, the current supply to drive motor 12 will correspondingly increase with the result that tensioning device 4 moves toward the left with regard to FIG. 6, thereby decreasing the preload on belt 2.

According to the modified control system of FIG. 7, the bearing means 35 for the reversing drum 3 are displaceably mounted in a carriage 36 and have interposed therebetween spring means F. Thus, when with decreasing load acting on belt 2, the load on the bearing means 35 for reversing drum 3 decreases so that spring F expands, the bearing means 35 will be displaced on carriage 36 toward the right with regard to FIG. 7. As a result thereof, the control resistor 37 arranged adjacent said bearing means is so adjusted that the connected circuit will act upon the controller 14 for the control motor 15 in such a way that carriage 36 by cable 34 is moved toward the right with regard to FIG. 7 with the result that the preload on or tensions of belt 2 is increased.

It is, or course, to be understood that the present invention is, by no means, limited to the specific showing in the drawing but also comprises any modifications within the scope of the appended claims.

What I claim is:

1. A long-distance conveyor which comprises: supporting means spaced from each other in the longitudinal direction of the conveyor and including troughing idlers, endless belt means supported by said supporting means and movable over said troughing idlers, driving means drivingly connected to said belt means, tensioning means associated with said belt means for exerting a variable preload upon said belt means, and control means operatively connected to said tensioning means and operable in conformity with variations in the load being transported by said conveyor to control said tensioning conversely means in such a manner that the preload exerted by said tensioning means upon said belt means will be increased considerably in response to a decrease in the load and vice versa.

2. A conveyor according to claim 1, which includes driving means drivingly connected to said belt means, said driving means including electric motor means, and regulating means responsive to the electrical energy power consumption of said motor means and operatively connected to said control means for actuating the same.

3. A long-distance conveyor which comprises: supporting means spaced from each other in the longitudinal direction of the conveyor and including troughing idlers, endless belt means supported by said supporting means and movable over said troughing idlers, driving means drivingly connected to said belt means, tensioning means associated with said belt means for exerting a preload upon said belt means, control means operatively connected to said tensioning means and operable in conformity with variations in the load being transported by said conveyor to control said tensioning means in such a manner that the preload exerted by said tensioning means upon said belt means will be increased in response to a decrease in the load and vice versa, reversing drum means at the end portions of the conveyor for reversing the moving direction of the belt section passing thereover, bearing means respectively rotatably supporting said drum means, and means responsive to the load acting upon at least one of said bearing means and operatively connected to said control means.

* * * * *